(12) United States Patent
Nageshappa et al.

(10) Patent No.: US 10,462,034 B2
(45) Date of Patent: Oct. 29, 2019

(54) DYNAMIC DISTRIBUTION OF NETWORK ENTITIES AMONG MONITORING AGENTS

(71) Applicant: Juniper Networks, Inc., Sunnyvale, CA (US)

(72) Inventors: Prashanth Kattige Nageshappa, Bangalore (IN); Vijayakumar Bangalore Subbarao, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 137 days.

(21) Appl. No.: 15/394,368

(22) Filed: Dec. 29, 2016

(65) Prior Publication Data

US 2018/0191597 A1    Jul. 5, 2018

(51) Int. Cl.
*H04L 12/26* (2006.01)
*H04L 29/08* (2006.01)

(52) U.S. Cl.
CPC .............. *H04L 43/14* (2013.01); *H04L 67/10* (2013.01)

(58) Field of Classification Search
CPC .......... H04L 43/14; H04L 43/08; H04L 67/10
USPC ........................................................ 709/224
See application file for complete search history.

(56) References Cited

U.S. PATENT DOCUMENTS

| | | | | |
|---|---|---|---|---|
| 7,590,714 B1 * | 9/2009 | Sosnovsky | .............. | G06F 9/542 709/223 |
| 9,276,826 B1 * | 3/2016 | Dickson | .................. | H04L 49/00 |
| 2006/0059253 A1 * | 3/2006 | Goodman | .............. | G06Q 10/06 709/223 |
| 2008/0222533 A1 * | 9/2008 | Hankejh | ................ | G06Q 10/10 715/738 |
| 2011/0307233 A1 * | 12/2011 | Tseng | .................. | G06F 17/5022 703/14 |
| 2012/0317274 A1 * | 12/2012 | Richter | .................. | G06Q 10/06 709/224 |

(Continued)

FOREIGN PATENT DOCUMENTS

WO    2013184846 A1    12/2013

OTHER PUBLICATIONS

Extended Search Report from counterpart European Application No. 17204769.8, dated Apr. 3, 2018, 7 pp.

(Continued)

*Primary Examiner* — Joseph L Greene
(74) *Attorney, Agent, or Firm* — Shumaker & Sieffert, P.A.

(57) ABSTRACT

Techniques are described for dynamically distributing entity monitoring assignments to a plurality of monitoring agents. In one example, processors of a co-location facility execute a plurality of network services monitoring agents. A first monitoring agent of the plurality of monitoring agents transmits instructions to a messaging service, causing the messaging service to dequeue, from a queue, a first message of a plurality of messages, wherein the first message describes a first network services entity of a plurality of network service entities. The monitoring agent transmits, to the first monitoring agent, the first message. The first monitoring agent retrieves, from the first network services entity described by the first message, performance and health metrics for the first network services entity. The first monitoring agent transmits, to the messaging service and for transmission to a database of the co-location facility, the performance and health metrics for the first network services entity.

23 Claims, 5 Drawing Sheets

(56) References Cited

U.S. PATENT DOCUMENTS

| | | |
|---|---|---|
| 2013/0332399 A1 | 12/2013 | Reddy et al. |
| 2016/0353268 A1 | 12/2016 | Senarath et al. |
| 2018/0091413 A1* | 3/2018 | Richards ............ H04L 12/4641 |
| 2018/0143852 A1* | 5/2018 | Ballantyne ............ G06F 9/5027 |

OTHER PUBLICATIONS

Hopps, "Analysis of an Equal-Cost Multi-Path Algorithm," Network Working Group, RFC 2992 Nov. 2000, 8 pp.

Sajassi, "BGP MPLS-Based Ethernet VPN," Internet Engineering Task Force, RFC 7432, Feb. 2015, 56 pp.

U.S. Appl. No. 14/228,844, filed by Rajagopalan Sivaramakrishnan, filed Mar. 28, 2014.

Response to Extended Search Report dated Apr. 3, 2018, from counterpart European Application No. 17204769.8, filed Jan. 3, 2019, 14 pp.

* cited by examiner

DYNAMIC DISTRIBUTION OF NETWORK ENTITIES AMONG MONITORING AGENTS

TECHNICAL FIELD

This disclosure generally relates to computer networks.

BACKGROUND

Network service providers are increasingly providing network services such as security, tunneling, virtual private networks, filtering, load-balancing, VoIP/Multimedia processing and various types of application proxies (HTTP, XML, WAP, etc.) to packet flows from customer devices. Service providers also provide content-specific services designed to improve the quality of a user's experience, for example, video streaming and caching. To provide these new services, service providers have often turned to specialized, dedicated physical or virtual appliances in some cases, routers or other network device have been modified to include additional hardware or software that applies various services to the incoming packets. For example, line cards installed in a service plane of a router may be configured to perform particular services, such as the services described above. In other example, service providers have deployed sophisticated service complex of specialized physical and/or virtual appliances to apply services to customer packet flows.

SUMMARY

This disclosure describes techniques for dynamically distributing entity monitoring assignments to a plurality of monitoring agents. A system as described herein includes a plurality of entities, e.g. physical devices and/or VNFs, which provide one or more network interconnection services to customers of a cloud exchange service. The system further includes a plurality of monitoring agents that monitor each of the plurality of entities (i.e., collect performance and health metrics for each of the plurality of entities). The system further includes a message queue for holding information describing a sequence for monitoring the plurality of entities, as well as information sufficient for the plurality of monitoring agents to identify the plurality of entities and retrieve performance and health metrics from each of the plurality of entities. The system further includes a time series database for storing the performance and health metrics for each of the monitored entities. In some examples, the system further includes an interface, such as a browser-based interface or command-line-interface (CLI), that allows a user to retrieve or view the performance and health metrics from the time series database, to add or remove entities to the queue for monitoring, and to instantiate or destroy additional monitoring agents to the system.

In one example, a method includes: executing, by one or more processors of a co-location facility, a plurality of network services monitoring agents, wherein executing the plurality of network services monitoring agents comprises: transmitting, by a first network services monitoring agent of the plurality of network services monitoring agents, instructions to a messaging service of the co-location facility, the instructions causing the messaging service to: dequeue, from a queue, a first message of a plurality of messages, wherein the first message describes a first network services entity of the plurality of network service entities; and transmit, to the first network services monitoring agent, the first message; receiving, by the first network services monitoring agent and from the messaging service, the first message; retrieving, by the first network services monitoring agent and from the first network services entity described by the first message, performance and health metrics for the first network services entity; and transmitting, by the first network services monitoring agent, to the messaging service, and for transmission to a database of the co-location facility, the performance and health metrics for the first network services entity.

In another example, a computing device of a co-location facility comprising one or more processors configured to: execute a plurality of network services monitoring agents, wherein, upon execution, a first network services monitoring agent of the plurality of network services monitoring agents is configured to: transmit instructions to a messaging service of the co-location facility, the instructions causing the messaging service to: dequeue, from a queue, a first message of a plurality of messages, wherein the first message describes a first network services entity of the plurality of network service entities; and transmit, to the first network services monitoring agent, the first message; receive, from the messaging service, the first message; retrieve, from the first network services entity described by the first message, performance and health metrics for the first network services entity; and transmit, to the messaging service, and for transmission to a database of the co-location facility, the performance and health metrics for the first network services entity.

In another example, a non-transitory computer-readable medium comprising instructions that, when executed, cause one or more processors of a computing device of a co-location facility to: execute a plurality of network services monitoring agents, wherein, upon execution of the plurality of network services monitoring agents, a first network services monitoring agent of the plurality of network services monitoring agents is configured to: transmit instructions to a messaging service of the co-location facility, the instructions causing the messaging service to: dequeue, from a queue, a first message of a plurality of messages, wherein the first message describes a first network services entity of the plurality of network service entities; and transmit, to the first network services monitoring agent, the first message; receive, from the messaging service, the first message; retrieve, from the first network services entity described by the first message, performance and health metrics for the first network services entity; and transmit, to the messaging service, and for transmission to a database of the co-location facility, the performance and health metrics for the first network services entity.

The details of one or more examples are set forth in the accompanying drawings and the description below. Other features, objects, and advantages will be apparent from the description and drawings, and from the claims.

DETAILED DESCRIPTION

Figure 1:
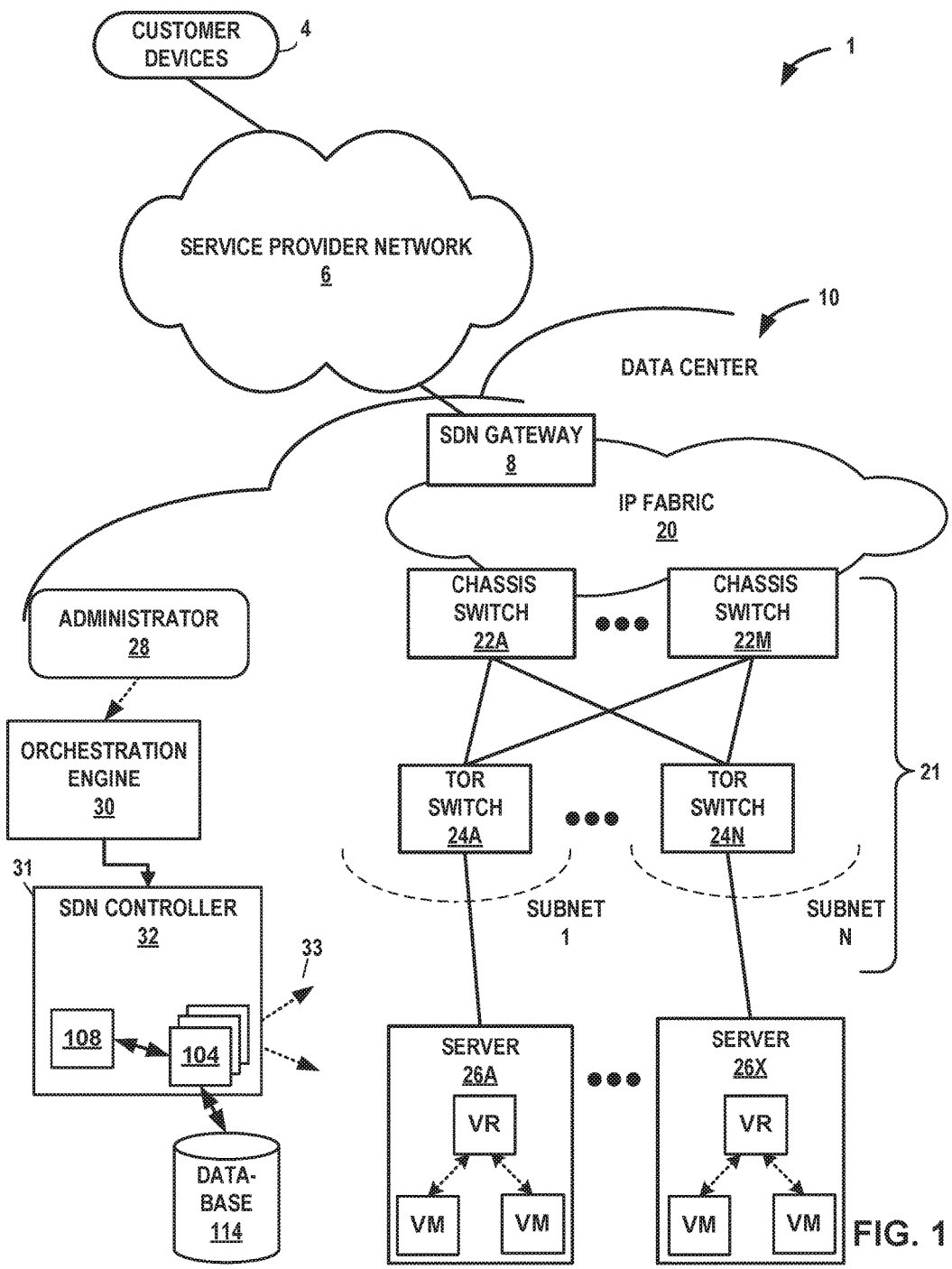
FIG. 1 is a block diagram illustrating an example network having a data center in which examples of the techniques described herein may be implemented.

In a cloud exchange system that provides a plurality of network services, one or more monitoring agents periodically monitor a large number of entities, such as physical devices and virtual network functions (VNFs). The monitoring agents collect performance and health metrics for each of the monitored entities and store the metrics in a central database for analysis by a user, such as a customer of the cloud exchange, a service provider, or a network administrator. Typically, the monitoring agents poll each entity because legacy entities may not support pushing telemetry data to the monitoring agents. Further, merely assigning equal numbers of entities to each monitoring agent may create inefficiencies due to the large number of monitored entities of many different types. For example, in a system that assigns, to a first monitoring agent, a dozen entities for which a minimal amount of time is required to retrieve metrics, and assigns, to a second monitoring agent, a dozen entities for which a large amount of time is required to retrieve metrics, the first monitoring agent may be underutilized, while the second monitoring agent may not have sufficient resources to monitor the entities to which it is assigned within time requirements for monitoring. Rather than having multiple instances of the monitoring agents such that each monitoring agent periodically monitors only a subset of the set of monitored entities, the techniques described herein implement a plurality of monitoring agents, each of which share a message queue that stores the next available monitoring task. Such a system provides for dynamic and flexible distribution of entities among multiple monitoring agents that allows for: 1) the dynamic addition or removal of one or more monitoring agents; 2) starting, stopping, and failure of one or more monitoring agents; 3) different time requirements to monitor different types of entities; 4) different time requirements for each periodic monitoring event; and 5) a desire to prevent static binding of specific entities to specific monitoring agents.

In one example operation of the system described herein, a monitoring agent thread dequeues, from the message queue, information required to connect to the next pending entity. The monitoring agent thread pulls metrics from that entity and uploads the metrics to the time series database. Upon completing a monitoring operation, the monitoring agent thread enqueues a new message containing the details of the monitored entity to the message queue to ensure that the entity receives periodic monitoring. In some examples, the monitoring agent thread uses a messaging service to enqueue and dequeue messages in the message queue. In these examples, the messaging service may wait for a predetermined time before enqueuing a message, or wait for a predetermined time after dequeuing a message and before transmitting the message of the monitoring agent thread to ensure that monitoring of the entity occurs only after the predetermined time elapses.

In some examples, the system further includes a messaging service that facilitates the exchange of messages between the monitoring agents, the queue, and the database. In this example, a monitoring agent thread issues a request to the messaging service, to dequeue a monitoring task from the queue. The messaging service, in turn, passes the request to the queue. In some examples, the messaging service retains the request for a predetermined time before passing the request to the queue. In this fashion, the system may ensure that each monitored entity is serviced periodically.

In some examples, the message queue is a First-in, First-out (FIFO) queue. The monitoring agent subsequently dequeues a next message from the message queue to perform monitoring of the next entity in line to be monitored. Thus, multiple instances of the monitoring agent may service the same message queue, such that each entity in the message queue is serviced by the next available monitoring agent.

When a monitoring agent should begin monitoring of an entity, a user may enqueue a message containing the details of the entity to the message queue, such that eventually, a monitoring agent dequeues the message and services that entity. To stop monitoring an entity, after servicing the entity, the user may remove the message containing the details of the entity from the message queue such that no further monitoring occurs. Alternatively, to cease further monitoring of an entity, the monitoring agent may dequeue any messages within the message queue describing that entity. Furthermore, to delay monitoring of an entity, when the monitoring agent enqueues a message containing the details of the entity to the message queue, the monitoring agent may further include information in the message describing a time to wait before further conducting monitoring of the entity.

Accordingly, the techniques described herein allow for the plurality of monitored entities within the system to be evenly distributed among the multiple instances of monitoring agents, based on the load each monitoring agent is handling and the time each monitoring agent requires to service an entity. Furthermore, monitoring agents may be dynamically added or removed from the system without reassigning the monitoring functions for each monitored entity or affecting the functioning of the overall monitoring system. Such a system may be more robust than other monitoring systems, as well as more efficiently distribute monitoring tasks to monitoring agents.

FIG. 1 is a block diagram illustrating an example network 1 having a data center in which examples of the techniques described herein may be implemented. In general, administrator 28 instructs orchestration engine 30, which in turn instructs SDN controller 32, to instantiate one or more monitoring agents 104. Monitoring agents 104 perform monitoring functions for a plurality of entities of data center 10, such as chassis switches 22A-22M (collectively, "chassis switches 22"), top-of-rack (TOR) switches 24A-24N (collectively, "TOR switches 24"), and servers 26A-26X (collectively, "servers 26").

In general, data center 10 provides an operating environment for applications and services for customer devices 4 coupled to the data center 10 by service provider network 6. Data center 10 hosts infrastructure equipment, such as networking and storage systems, redundant power supplies, and environmental controls. Service provider network 6 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 is a facility that provides network services for devices 4 of customers. Customers may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some examples, data center 10 is an individual network server, a network peer, or otherwise.

In this example, data center 10 includes a set of storage systems and application servers 26 interconnected via high-speed switch fabric 21 provided by one or more tiers of physical network switches and routers. Servers 26 function as compute nodes of the data center. For example, each of servers 26 may provide an operating environment for execution of one or more customer-specific virtual machines ("VMs" in FIG. 1). Switch fabric 21 is provided by a set of interconnected TOR switches 24 coupled to a distribution layer of chassis switches 22. Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 24 and chassis switches 22 provide servers 26 with redundant (multi-homed) connectivity to IP fabric 20. Chassis switches 22 aggregate traffic flows and provides high-speed connectivity between TOR switches 24. TOR switches 24 are network devices that provide layer two (e.g., MAC) and/or layer 3 (e.g., IP) routing and/or switching functionality. TOR switches 24 and chassis switches 22 each include one or more processors and a memory, and that are capable of executing one or more software processes. Chassis switches 22 are coupled to IP fabric 20, which performs layer 3 routing to route network traffic between data center 10 and customer devices 4 by service provider network 6. Software-Defined Network ("SDN") gateway 8 acts to forward and receive packets between IP fabric 20 and service provider network 6.

Software-Defined Networking ("SDN") controller 32 provides a logically and in some cases physically centralized controller for facilitating operation of one or more virtual networks within data center 10 in accordance with one or more examples of this disclosure. The terms SDN controller and Virtual Network Controller ("VNC") may be used interchangeably throughout this disclosure. In some examples, SDN controller 32 operates in response to configuration input received from orchestration engine 30 via northbound API 31, which in turn operates in response to configuration input received from administrator 28. Additional information regarding SDN controller 32 operating in conjunction with other devices of data center 10 or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

In some examples, orchestration engine 30 manages functions of data center 10 such as compute, storage, networking, and application resources. For example, orchestration engine 30 may create a virtual network for a tenant within data center 10 or across data centers. Orchestration engine 30 may attach virtual machines (VMs) to a tenant's virtual network. Orchestration engine 30 may connect a tenant's virtual network to some external network, e.g. the Internet or a VPN. Orchestration engine 30 may implement a security policy across a group of VMs or to the boundary of a tenant's network. Orchestration engine 30 may deploy a network service (e.g. a load balancer) in a tenant's virtual network.

In some examples, SDN controller 32 manages the network and networking services such load balancing, security, and allocate resources from servers 26 to various applications via southbound API 33. That is, southbound API 33 represents a set of communication protocols utilized by SDN controller 32 to make the actual state of the network equal to the desired state as specified by orchestration engine 30. For example, SDN controller 32 implements high-level requests from orchestration engine 30 by configuring physical switches, e.g. TOR switches 24, chassis switches 22, and switch fabric 21; physical routers; physical service nodes such as firewalls and load balancers; and virtual services such as virtual firewalls in a VM. SDN controller 32 maintains routing, networking, and configuration information within a state database.

Typically, the traffic between any two network devices, such as between network devices within IP fabric 20 (not shown) or between servers 26 and customer devices 4 or between servers 26, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port, and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

As describe herein, each of servers 26 include a respective virtual router ("VR" in FIG. 1) that executes multiple routing instances for corresponding virtual networks within data center 10 and routes the packets to appropriate virtual machines executing within the operating environment provided by the servers. Packets received by the virtual router of server 26A, for instance, from the underlying physical network fabric may include an outer header to allow the physical network fabric to tunnel the payload or "inner packet" to a physical network address for a network interface of server 26 that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In some aspects, the virtual router buffers and aggregates multiple tunneled packets received from the underlying physical network fabric prior to delivery to the appropriate routing instance for the packets. That is, a virtual router executing on one of servers 26 may receive inbound tunnel packets of a packet flow from TOR switches 24 and, prior to routing the tunnel packets to a locally executing virtual machine, process the tunnel packets to construct a single, aggregate tunnel packet for forwarding to the virtual machine. That is, the virtual router may buffer multiple inbound tunnel packets and construct the single, tunnel packet in which the payloads of the multiple tunnel packets are combined into a single payload and the outer/overlay headers on the tunnel packets are removed and replaced with a single header virtual network identifier. In this way, the aggregate tunnel packet can be forwarded by the virtual router to the virtual machine as if a single inbound tunnel packet was received from the virtual network. Moreover, to perform the aggregation operation, the virtual router may leverage a kernel-based offload engine that seamlessly and automatically directs the aggregation of tunnel packets. Further example techniques by which the virtual routers forward traffic to the customer-specific virtual machines executing on servers 26 are described in U.S. patent application Ser. No. 14/228,844, entitled "PACKET SEGMENTATION OFFLOAD FOR VIRTUAL NETWORKS," incorporated herein by reference.

In some example implementations, the virtual routers executing on servers 26 steer received inbound tunnel packets among multiple processor cores to facilitate packet processing load balancing among the cores when processing the packets for routing to one or more virtual and/or physical machines. As one example, server 26A includes multiple network interface cards and multiple processor cores to execute the virtual router and steers received packets among multiple processor cores to facilitate packet processing load balancing among the cores. For instance, a particular network interface card of server 26A may be associated with a designated processor core to which the network interface card directs all received packets. The various processor cores, rather than processing each of the received packets, offloads flows to one or more other processor cores, in accordance with a hash function applied to at least one of the inner and outer packet headers, for processing to take advantage of available work cycles of the other processor cores.

In one example operation of the system described herein, a monitoring agent thread 104 dequeues, from a message queue 108, information required to connect to the next pending entity, such as one of chassis switches 22, TOR switches 24, servers 26, or a VR or VM executed by servers 26. The monitoring agent thread 104 pulls metrics from the entity and uploads the metrics to database 114, which may represent a time series database. Upon completing this monitoring operation (or potentially after a period of delay), the monitoring agent thread 104 enqueues a new message with a "delay" option set for a preset amount of delay containing the details of the monitored entity to the message queue to ensure that the entity receives periodic monitoring. The monitoring agent thread 104 subsequently dequeues a next message from message queue 108 to perform monitoring of the next entity in line to be monitored. Thus, multiple instances of monitoring agent threads 104 may service the same message queue 108, such that each entity described by the message queue 108 is serviced by the next available monitoring agent 104. Thus, rather than having monitoring agent threads expressly assigned to an entity, monitoring agent threads 104 may determine which of the entities is to be monitored at a particular time based upon information of a dequeued message from message queue 108.

Administrator 28 may instruct the monitoring agents 104 to begin monitoring one of the entities. In response, SDN controller 32 (or one of monitoring agents 104) may enqueue a message containing the details of the entity to message queue 108, such that eventually (i.e., once other enqueued messages prior to the message have been dequeued), a monitoring agent 104 dequeues the message and services that entity. To stop monitoring an entity, after servicing the entity, the monitoring agent 104 does not enqueue a new message containing the details of the entity to the message queue 108 and simply discards the original message containing the details of the entity. Furthermore, to delay monitoring of an entity, the monitoring agent 104 waits for a predetermined amount of time before enqueuing the message containing the details of the entity to the message queue 108. In other examples, the monitoring agent 104 may include information in the message describing a time to wait before further conducting monitoring of the entity.

Accordingly, the techniques described herein allow for distributing monitoring functions for the plurality of monitored entities within the system amongst multiple instances of monitoring agents 104, based on the load each monitoring agent 104 is currently handling and the time each monitoring agent 104 requires to service an entity. Furthermore, monitoring agents 104 may be dynamically added to or removed from the system without reassigning the monitoring functions for each monitored entity 104 or affecting the functioning of the overall monitoring system. Such a system may be more robust than other monitoring systems, as well as more efficiently distribute monitoring tasks to monitoring agents 104.

For example, in another system that assigns, to a first monitoring agent, a dozen entities for which a minimal amount of time is required to retrieve metrics, and assigns, to a second monitoring agent, a dozen entities for which a large amount of time is required to retrieve metrics, the first monitoring agent may be underutilized or idle for a large amount of time. Conversely the second monitoring agent may not have sufficient resources to monitor the entities to which it is assigned within time requirements for monitoring, and therefore entities assigned to the second monitoring agent may not receive adequate monitoring.

In contrast, in the system as described herein, the first and second monitoring agents share the same queue, so if the first monitoring agent is occupied with a monitoring task that takes a large amount of time, the second monitoring agent may continue to service entities in the queue. As soon as the first monitoring agent completes its task, it may retrieve the next monitoring task from the queue. Thus, the system as described herein may help to ensure that entities that require servicing are serviced by the next available monitoring agent in the order that the entities require monitoring. Further, the system as described herein may ensure that each of the monitoring tasks are distributed amongst the monitoring agents in a similar fashion (i.e., both the first and second monitoring agents continue to retrieve monitoring tasks as soon as they are free).

Figure 2:
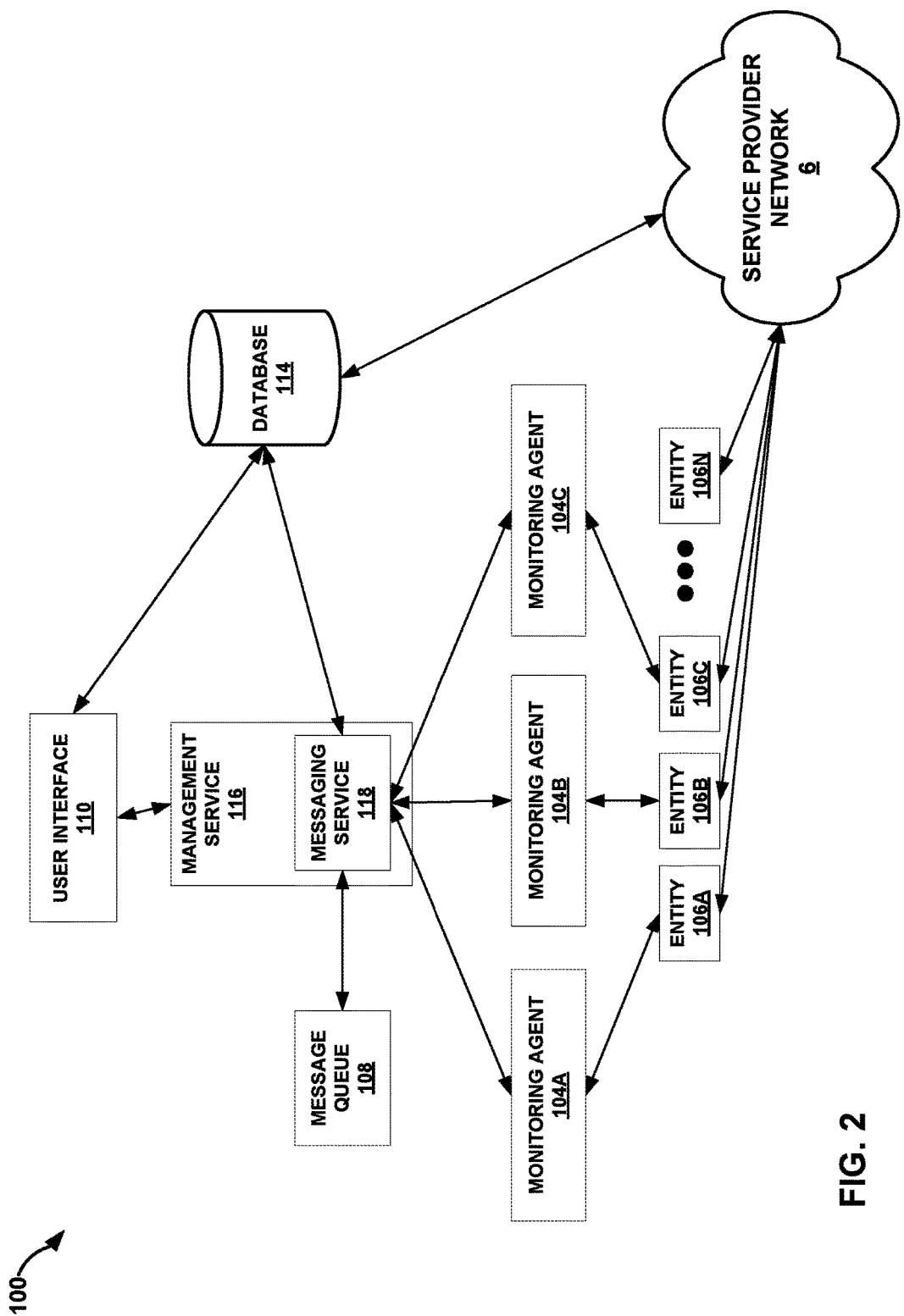
FIG. 2 is a block diagram illustrating an example system for dynamically distributing entity monitoring assignments to a plurality of monitoring agents according to the techniques of the disclosure.

FIG. 2 is a block diagram illustrating an example system 100 for dynamically distributing entity monitoring assignments to a plurality of monitoring agents according to the techniques of the disclosure. In the example of FIG. 2, system 100 includes a plurality of entities 106A-106N (collectively, "entities 106") that provide one or more network services to customers of a service provider network 6. System 100 further includes a plurality of monitoring agents 104A-104C (collectively, "monitoring agents 104") for monitoring performance and health of entities 106 and a message queue 108 for storing messages that identify specific ones of entities 106 as targets for monitoring. System 100 further includes a time series database 114 for storing performance and health information for entities 106 and a user interface 110 for allowing a user to access the performance and health information. Management service 116 performs various management functions for system 100. Management service further includes a messaging service 118 for facilitating the exchange of messages between various elements of system 100, such as monitoring agents 104, message queue 108, and database 114.

In some examples, system 100 is a co-location data facility or data center, such as data center 10 of FIG. 1, that provides an operating environment for applications and services for customers coupled to the system by a service provider network 6.

Entities 106 provide one or more network services to customers of a service provider network 6. In some examples, entities 106 are one of chassis switches 22, TOR switches 24, servers 26, or a VR or VM executed by servers 26 of FIG. 1. In further examples, entities 106 are physical devices, such as one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. In other examples, entities 106 are virtualized devices, such as virtual routers that execute multiple routing instances for corresponding virtual networks within system 100 and route packets to appropriate virtual machines executing on servers or hosts 106 of system 100.

Message queue 108 is a data structure for organizing the messages describing entities 106. Message queue 108 may be configured according to a First-in, First-out (FIFO) paradigm, such that, assuming there are N enqueued messages when an N+1 message is enqueued, the N+1 message will be dequeued after N+1 dequeues, for all enqueued messages in message queue 108. Message queue 108 stores a plurality of messages, wherein each message corresponds to an entity 106, and the message contains information for assisting a monitoring agent 104 with retrieving performance and metrics from the corresponding entity 106. While in the example of FIG. 2, message queue 108 is a simple FIFO queue, in other examples, message queue 108 may sort or otherwise arrange messages within message queue (e.g., a priority queue), such as according to time since the last monitoring event, time spent in the queue, priority of the corresponding entity 106 over other entities 106, or other conventions.

Management service 116 performs various management functions for system 100. For example, management service 116 performs, in response to instructions from a user via user interface 110, instantiation of additional instances of monitoring agents 104 or destruction of existing monitoring agents 104. In this fashion, a user may use management service 116 to dynamically adjust the number of active monitoring agents 104.

Management service further includes a messaging service 118 for facilitating the exchange of messages between various elements of system 100, such as monitoring agents 104, message queue 108, and database 114. Messaging service 118 acts as a broker to facilitate the asynchronous exchange of messages and notifications between multiple instances of monitoring agents 104, message queue 108, and database 114.

In general, monitoring agents 104 are configured to dequeue a message from message queue 108 when ready to perform a monitoring task. Thus, in one example operation of system 100, assuming monitoring agent 104A is ready to perform a monitoring task before the other monitoring agents 104, monitoring agent 104A issues an instruction to messaging service 118 to dequeue, from message queue 108, information required to connect to the next pending entity (e.g., entity 106A). Messaging service 118 dequeues, from message queue 108, the information and forwards the information to monitoring agent 104A. Using the information received from queue 108 via messaging service 118, monitoring agent 104A issues a pull request to entity 106A. In response to the pull request, entity 106A transmits performance and health metrics for entity 106A to monitoring agent 104. Monitoring agent 104A forwards the received metrics messaging service 118 for forwarding to time series database 114. In turn, messaging service 118 forwards the received metrics to time series database 114 for storage.

After forwarding the received metrics to the messaging service 118 for forwarding to database 114, monitoring agent 104A generates a new message containing information describing monitored entity 106A and forwards the message to messaging service 118 for enqueuing in message queue 108. Messaging service 118 enqueues the message in message queue 108 to ensure that a subsequent one of monitoring agents 104 performs monitoring of entity 106A. In some examples, monitoring agent 104A includes a predetermined time period in the message, and messaging service 118 waits until the predetermined time period has elapsed before enqueuing the message in message queue 108. In this fashion, messaging service 118 ensures that subsequent monitoring of entity 106A occurs only after the predetermined time period has elapsed, so as to avoid unnecessary monitoring operations.

After transmitting the new message to messaging service 118 for enqueuing in queue 108, monitoring agent 104A transmits a request to messaging service 118 to dequeue a subsequent message from queue 108 that instructs monitoring agent 104A to perform monitoring of the next entity in line to be monitored. Moreover, while monitoring agent 104A is monitoring one of entities 106, other monitoring agents 104 may request respective messages from message queue 108 and monitor corresponding entities 106. Thus, multiple instances of monitoring agents 104 may service the same message queue 108 at at the same time, such that each entity 106 having a corresponding message in the message queue 108 is serviced by the next available one of monitoring agents 104.

Further, when a user or administrator, such as administrator 28 of FIG. 1, determines that monitoring agents 104 should begin monitoring of an entity 106 that has not previously been monitored, the user instructs, via user interface 110, system 100 to begin monitoring of the entity 106. In response to the instruction, monitoring agent 104A generates a message containing the details of the entity 106 and transmits the message to messaging service 118 for enqueuing in message queue 108. To stop monitoring an entity, the user instructs, via user interface 110, system 100 to cease monitoring of the entity. In response to the instructions and upon servicing entity 106, monitoring agent 104A does not transmit a new message describing entity 106 to messaging service 118 for enqueuing in message queue 108. Furthermore, to delay monitoring of entity 106 until a predetermined time, messaging service 118 may wait for a predetermined amount of time prior to enqueuing a message containing the details of entity 106 in message queue 108.

Accordingly, the techniques described herein allow monitoring processes for the plurality of monitored entities 106 within system 100 to be distributed among multiple instances of monitoring agents 104, based on the load each of monitoring agents 104 is handling and the time each of monitoring agents 104 requires to service an entity 106. Furthermore, management service 116 may dynamically add, in response to instructions received via user interface 110, additional monitoring agents 104 to system 100 without reassigning the monitoring functions for each monitored entity 106 or affecting the functioning of the overall monitoring system 100. Therefore, such a system as described herein may be more robust than other monitoring systems and may more efficiently distribute monitoring tasks to monitoring agents 104.

Figure 3:
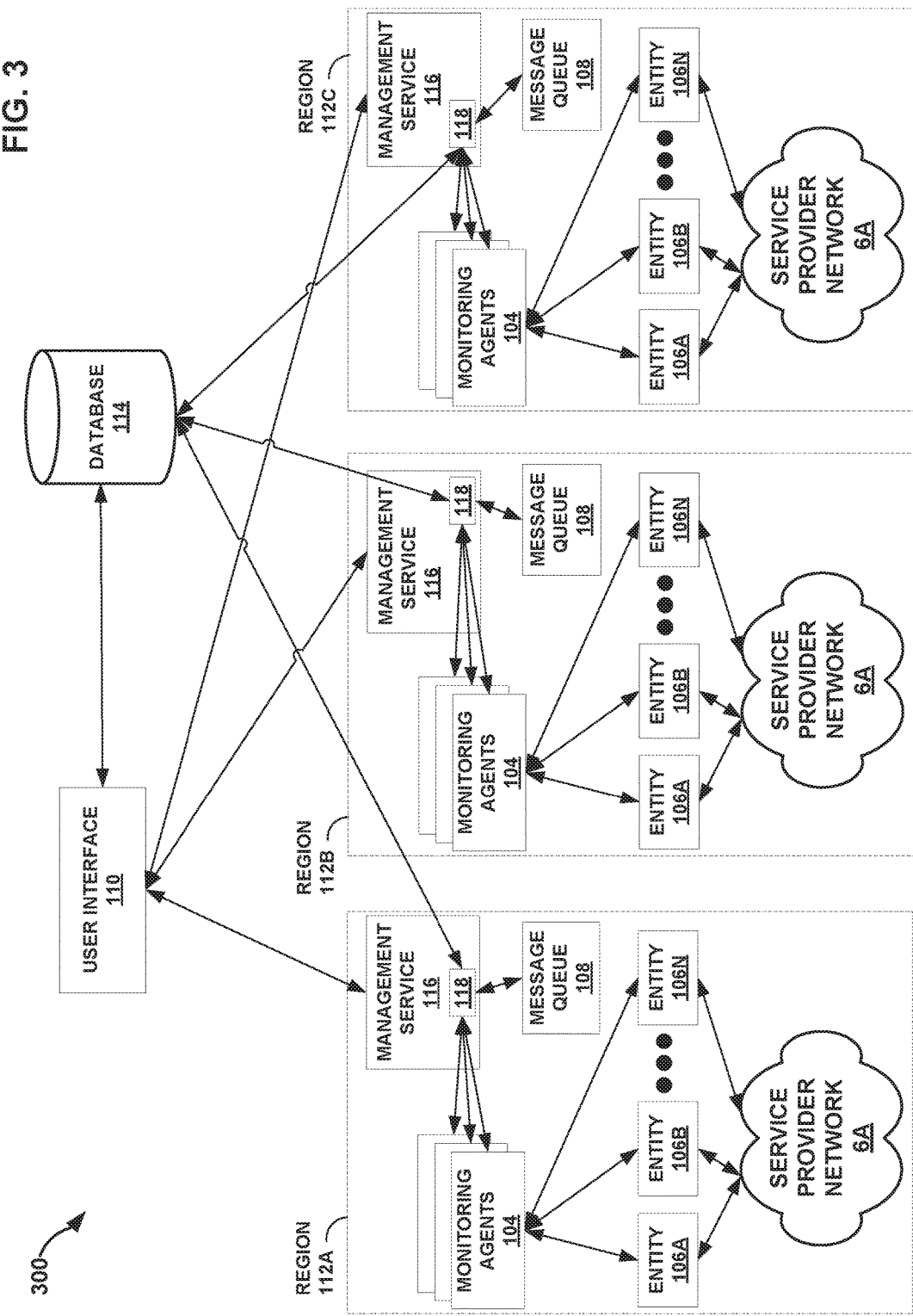
FIG. 3 is a block diagram illustrating an example system for dynamically distributing entity monitoring assignments to a plurality of monitoring agents according to the techniques of the disclosure.

FIG. 3 is a block diagram illustrating an example system 300 for dynamically distributing entity monitoring assignments to a plurality of monitoring agents according to the techniques of the disclosure. In the example of FIG. 3, system 300 includes plurality of regions 112A-112N (collectively, "regions 112"), wherein each of regions 112 includes a plurality of entities 106A-106N (collectively, "entities 106") that provide one or more network services to customers of that region. Each of regions 112 further include a plurality of monitoring agents 104 for monitoring performance and health of entities 106 and a message queue 108 for storing messages that identify specific ones of entities 106 as targets for monitoring. Additionally, each of regions 112 include a management service 116 for managing various aspects of the monitoring agents 104 and message queue 108. Management service 116 further includes a messaging service 118 for brokering messages and notifications between monitoring agents 104, message queue 108, and database 114. System 300 further includes a time series database 114 for storing performance and health information for entities 106 and a user interface 110 for allowing a user to access the performance and health information. Each of entities 106, monitoring agents 104, message queues 108, management service 116, messaging service 118, and database 114 of FIG. 3 may function in a substantially similar fashion to the like elements of FIG. 2.

In the example of FIG. 3, each management service 116 may dynamically add or remove, in response to instructions received via user interface 110, monitoring agents 104 to each region 112 of system 300. Because each of the monitoring agents 104 service the same queue 108 within a region 112, monitoring agents may be instantiated or destroyed within a specific region without reassigning the monitoring functions for each monitored entity 106 or affecting the functioning of the overall monitoring system 300 across all the regions 112, or even within a particular region. Therefore, such a system 300 as described herein may dynamically allocate monitoring functions based on the specific load each region is experiencing. Furthermore, each region may store performance and health metrics for each of the monitored entities across regions 112 in a centralized time-share database 114 to facilitate review and analysis of the performance and health metrics by a user. Accordingly, such a system may be more robust than other monitoring systems and may more efficiently distribute monitoring tasks to monitoring agents 104.

Figure 4:
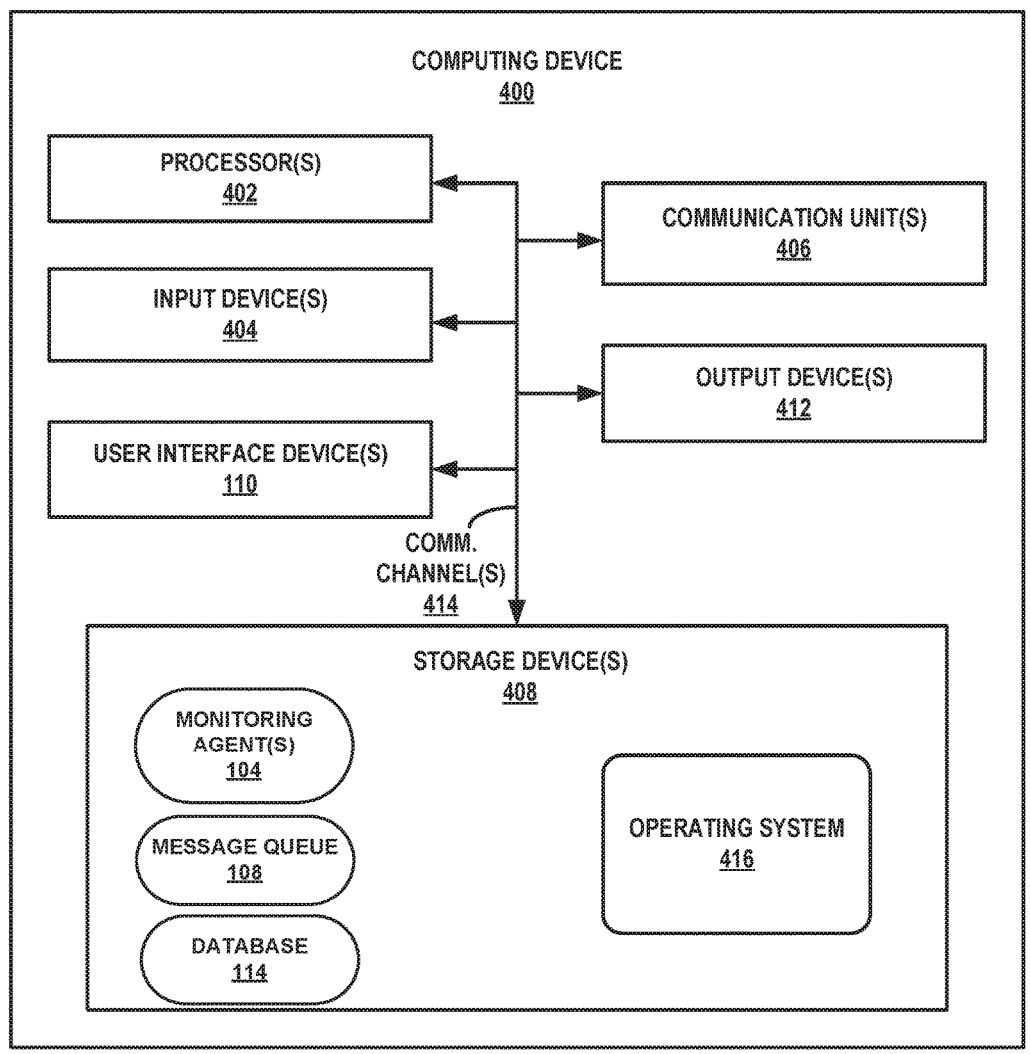
FIG. 4 is a block diagram illustrating an example computing device 400 for performing the techniques as discussed with respect to the system 100 of FIG. 1.

FIG. 4 is a block diagram illustrating an example computing device 400 for performing the techniques as discussed with respect to the system 100 of FIG. 1. FIG. 4 illustrates a particular example of a computing device 400 that includes one or more processor(s) 402 for executing any one or more of monitoring agents 104, message queue 108, and database 114 of FIG. 1 as described herein. Other examples of computing device 400 may be used in other instances. Although shown in FIG. 4 as a stand-alone computing device 400 for purposes of example, a computing device may be any component or system that includes one or more processors or other suitable computing environment for executing software instructions and, for example, need not necessarily include one or more elements shown in FIG. 4 (e.g., communication units 406; and in some examples components such as storage device(s) 408 may not be co-located or in the same chassis as other components). Computing device 400 may execute, for example, SDN controller 32 of data center 10, and may be located within data center 10, another interconnection facility, or at a branch office or cloud computing environment employed or used by a cloud exchange provider. Multiple computing devices 400 may execute corresponding instances of monitoring agents 104, message queue 108, management service 116, messaging service 118, and database 114 in a distributed manner, e.g., as discussed above with respect to FIG. 3. In some cases, each of the multiple computing devices 400 may execute different combinations of monitoring agents 104, message queue 108, and database 114. In other words, a single computing device 400 may not execute each of monitoring agents 104, message queue 108, and database 114.

As shown in the specific example of FIG. 4, computing device 400 includes one or more processors 402, one or more input devices 404, one or more communication units 406, one or more output devices 412, one or more storage devices 408, and user interface (UI) device 110, and communication unit 406. Computing device 400, in one example, further includes one or more monitoring agents 104, message queue 108, and database 114 that are executable by, computing device 400. Each of components 402, 404, 406, 408, 110, and 412 are coupled (physically, communicatively, and/or operatively) for inter-component communications. In some examples, communication channels 414 may include a system bus, a network connection, an inter-process communication data structure, or any other method for communicating data. As one example, components 402, 404, 406, 408, 110, and 412 may be coupled by one or more communication channels 414.

Processors 402, in one example, are configured to implement functionality and/or process instructions for execution within computing device 400. For example, processors 402 may be capable of processing instructions stored in storage device 408. Examples of processors 402 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 408 may be configured to store information within computing device 400 during operation. Storage device 408, in some examples, is described as a computer-readable storage medium. In some examples, storage device 408 is a temporary memory, meaning that a primary purpose of storage device 408 is not long-term storage. Storage device 408, in some examples, is described as a volatile memory, meaning that storage device 408 does not maintain stored contents when the computer is turned off. Examples of volatile memories include random access memories (RAM), dynamic random access memories (DRAM), static random access memories (SRAM), and other forms of volatile memories known in the art. In some examples, storage device 408 is used to store program instructions for execution by processors 402. Storage device 408, in one example, is used by software or applications running on computing device 400 to temporarily store information during program execution.

Storage devices 408, in some examples, also include one or more computer-readable storage media. Storage devices 408 may be configured to store larger amounts of information than volatile memory. Storage devices 408 may further be configured for long-term storage of information. In some examples, storage devices 408 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 400, in some examples, also includes one or more communication units 406. Computing device 400, in one example, utilizes communication units 406 to communicate with external devices via one or more networks, such as one or more wired/wireless/mobile networks. Communication units 406 may include a network interface card, such as an Ethernet card, an optical transceiver, a radio frequency transceiver, or any other type of device that can send and receive information. Other examples of such network interfaces may include 3G and WiFi radios. In some examples, computing device 400 uses communication unit 406 to communicate with an external device.

Computing device 400, in one example, also includes one or more user interface devices 110. User interface devices 110, in some examples, are configured to receive input from a user through tactile, audio, or video feedback. Examples of user interface devices(s) 110 include a presence-sensitive display, a mouse, a keyboard, a voice responsive system, video camera, microphone or any other type of device for detecting a command from a user. In some examples, a presence-sensitive display includes a touch-sensitive screen.

One or more output devices 412 may also be included in computing device 400. Output device 412, in some examples, is configured to provide output to a user using tactile, audio, or video stimuli. Output device 412, in one example, includes a presence-sensitive display, a sound card, a video graphics adapter card, or any other type of device for converting a signal into an appropriate form understandable to humans or machines. Additional examples of output device 412 include a speaker, a cathode ray tube (CRT) monitor, a liquid crystal display (LCD), or any other type of device that can generate intelligible output to a user.

Computing device 400 may include operating system 416. Operating system 416, in some examples, controls the operation of components of computing device 400. For example, operating system 416, in one example, facilitates the communication of one or more monitoring agents 104, message queue 108, and database 114 with processors 402, communication unit 406, storage device 408, input device 404, user interface devices 110, and output device 412. Monitoring agents 104, message queue 108, management service 116, messaging service 118, and database 114 may also include program instructions and/or data that are executable by computing device 400.

Figure 5:
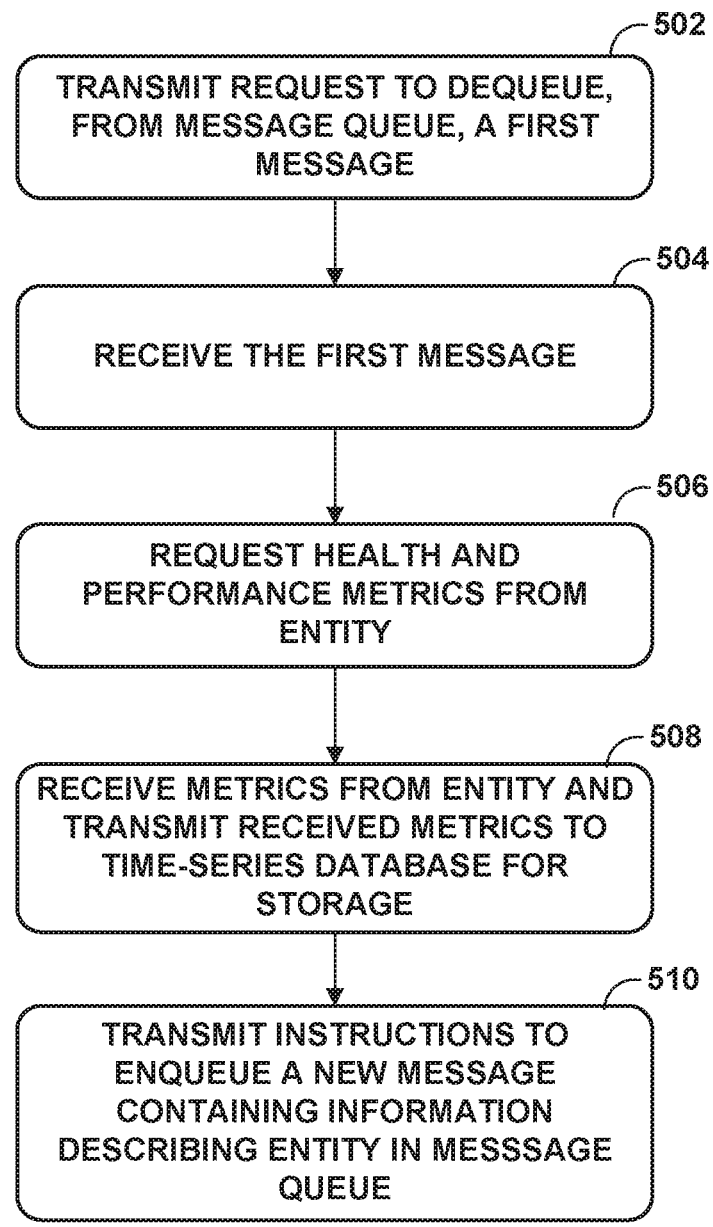
FIG. 5 is a flowchart illustrating an example operation for dynamically distributing entity monitoring assignments to a plurality of monitoring agents according to the techniques of the disclosure.

FIG. 5 is a flowchart illustrating an example operation for dynamically distributing entity monitoring assignments to a plurality of monitoring agents according to the techniques of the disclosure. For convenience, FIG. 5 is described as being performed by monitoring agent 104A of FIG. 2, and with respect to other components of FIG. 2. It should be understood, however, that other devices in other systems may be configured to perform this or a similar method.

In one example operation of system 100, monitoring agent 104A transmits a request to messaging service 118 to dequeue, from message queue 108, a first message (502). The first message includes information required to connect to an entity (e.g., entity 106A) which is the next pending entity to be monitored. For example, the message may include a name of the entity, routing and pathing information to connect to the entity, a communication protocol for communicating with the entity (e.g., such as Border Gateway Protocol (BGP)), a type of service or function that the entity performs, and types of performance and health metrics to be collected, an Internet Protocol (IP) address of the entity, a Media Access Control (MAC) address of the entity, a protocol to use when connecting with the entity, a token to use to connect to the entity, or any combination of the foregoing. In response to the request, messaging service 118 dequeues the message from the message queue 108 and transmits the message to monitoring agent 104A.

Monitoring agent 104A receives the message that indicates the next entity for monitoring (504). Monitoring agent 104A requests health and performance metrics from entity 106A (506). In typical operation, entities 106 operate in a "pull" configuration. In other words, monitoring agent 104A issues a pull request to entity 106A via BGP. Monitoring agents 104 and entities 106 may interoperate using BGP in accordance with the techniques described in "BGP MPLS-Based Ethernet VPN," RFC7432, as referenced above, the entire contents of which are incorporated herein by reference. In response to the pull request, entity 106A compiles various performance and health metrics for entity 106. For example, such metrics may include information describing a hardware configuration, a software configuration, network bandwidth, connectivity, routing, and pathing information, usage statistics such as up-time, down-time, service usage, notifications, alerts, or error messages, or any combination of the foregoing. Upon collecting the metrics, entity 106A transmits the performance and health metrics to monitoring agent 104. Such performance and health metrics include, for example, a number of bytes sent since the last monitoring event, a number of bytes sent within a predetermined period of time (e.g., the last second, minute, hour, day, or week), a total number of bytes sent, a number of bytes received since the last monitoring event, a number of bytes received within the predetermined period of time, a total number of bytes received, current CPU usage, average CPU usage over the predetermined period of time, peak CPU usage over the predetermined period of time, current memory usage, average memory usage over the predetermined period of time, and peak memory usage over the predetermined period of time.

Monitoring agent 104A receives the metrics from entity 106 and transmits the received metrics to time series database 114 for storage (506). In some examples, monitoring agent 104 transmits the information to messaging service 118, which, in turn, transmits the information to time series database 114 via BGP. Time series database 114 stores the performance and health metrics for subsequent review and analysis by a user. In some examples, time series database presents the metrics to a user for display via user interface 110, which may be a command-line interface (CLI) or a browser-based dashboard.

Upon forwarding the received metrics to database 114, monitoring agent 104A generates a new message containing information describing entity 106A. Monitoring agent 104 transmits instructions to message service 118 to enqueue the new message containing the information describing the entity 104A in message queue 108 (510). In alternate examples, monitoring agent 104A re-sends the first message pulled from the queue 108 to messaging service 118. Messaging service 118, in turn, enqueues the message within message queue 108.

In some examples, messaging service 118 immediately dequeues the first message and transmits the message to a subsequent monitoring agent 104, which, in turn, immediately performs monitoring of the entity 106. In other examples, messaging service 118 waits for a predetermined time before enqueuing a new message within queue 108. In doing so, messaging service 118 ensures that a predetermined delay elapses before a subsequent monitoring agent 104 (which may be any of monitoring agents 104A, 104B, or 104C, etc.) repeats monitoring of entity 106A. Alternatively, messaging service waits for a predetermined delay or time after dequeuing the message in the queue 108 before transmitting the message to the subsequent monitoring agent 106.

Thus, multiple instances of monitoring agents 104 may service the same message queue 108. As a first monitoring agent 104A receives, via messaging service 118, a first message from message queue 108 and services a first entity 106A, a second monitoring agent 104B may receive, via monitoring service 118, a second message from message queue 108 and service a second entity 106B, while a third monitoring agent 104C may receive, via monitoring service 118, a third message from message queue 108 and service a third entity 106C, and so one. Such a system ensures that each monitoring agent 104, upon completing a monitoring function, immediately receives a subsequent task. Further, such a system ensures that each pending entity is serviced by the next free monitoring agent 104, which may be more efficient than a system that statically assigns entities to monitoring agents.

The techniques described in this disclosure may be implemented in hardware, software, firmware or any combination thereof. For example, various aspects of the techniques may be implemented within one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

When implemented in software, the functionality ascribed to the systems and devices described in this disclosure may be embodied as instructions on a computer-readable medium such as random access memory (RAM), read-only memory (ROM), non-volatile random access memory (NVRAM), electrically erasable programmable read-only memory (EEPROM), FLASH memory, magnetic media, optical media, or the like. The instructions are executed to support one or more aspects of the functionality described in this disclosure.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method for distributing monitoring functions amongst a plurality of network services monitoring agents, the method comprising:
    executing, by one or more processors of a co-location facility, a queue, wherein a plurality of messages are enqueued within the queue, and wherein each message of the plurality of messages comprises information identifying a corresponding network service entity of a plurality of network service entities, wherein the plurality of network service entities comprises a plurality of physical devices and a plurality of virtual network functions (VNFs);
    executing, by the one or more processors of the co-location facility, the plurality of network services monitoring agents, wherein executing the plurality of network services monitoring agents comprises:

requesting, by a first network services monitoring agent of the plurality of network services monitoring agents, a next network service entity of the plurality of network service entities for monitoring by the first network services monitoring agent by transmitting instructions to a messaging service of the co-location facility, the instructions causing the messaging service to:
- dequeue, from the queue, a first message of the plurality of messages, wherein the first message comprises information identifying a first network service entity of the plurality of network service entities; and
- transmit, to the first network services monitoring agent, the first message;

receiving, by the first network services monitoring agent and from the messaging service, the first message;

identifying, by the first network services monitoring agent and based on the information identifying the first network service entity, the first network service entity as the next network service entity of the plurality of network service entities for monitoring by the first network services monitoring agent;

retrieving, by the first network services monitoring agent and from the first network service entity, performance and health metrics for the first network services monitoring agent; and transmitting, by the first network services monitoring agent, to the messaging service, and for transmission to a database of the co-location facility, the performance and health metrics for the first network service entity.

2. The method of claim 1, further comprising:
transmitting, by the first network services monitoring agent, to the messaging service, and for enqueuing in the queue, the first message; and
enqueuing, by the messaging service and in the queue, the first message after transmitting, by the messaging service and to the database, the performance and health metrics for the first network service entity.

3. The method of claim 2, further comprising transmitting, by the first network services monitoring agent and to the messaging service, a predetermined time, and wherein enqueuing, by the messaging service and in the queue, the first message comprises enqueuing, by the messaging service and in the queue, the first message after the predetermined time elapses.

4. The method of claim 2, wherein executing the plurality of network services monitoring agents further comprises:
receiving, by the first network services monitoring agent, instructions to suspend retrieval of performance and health metrics for the first network service entity;
transmitting, by the first network services monitoring agent and to the messaging service, instructions causing the messaging service to:
- dequeue, from the queue, the first message describing the first network service entity; and
- upon transmitting, to the database of co-location facility, the performance and health metrics for the first network service entity, discard, the first message without enqueuing the first message in the queue.

5. The method of claim 1, wherein executing the plurality of network services monitoring agents further comprises:
receiving, by the first network services monitoring agent, instructions to commence retrieval of performance and health metrics for a second network service entity of the plurality of network service entities;
determining, by the first network services monitoring agent, that the queue does not contain a corresponding message comprising information identifying the second network service entity; and
transmitting, by the first network services monitoring agent, to the messaging service, and for enqueueing in the queue, a second message comprising information identifying the second network service entity.

6. The method of claim 1, further comprising:
determining, by the one or more processors, to adjust a number of the plurality of network services monitoring agents; and
in response to determining to adjust the number of the plurality of network services monitoring agents, performing one of an instantiation of one or more network services monitoring agents or a destruction of one or more network services monitoring agents.

7. The method of claim 1, wherein executing the plurality of network services monitoring agents further comprises:
requesting, by a second network services monitoring agent of the plurality of network services monitoring agents, a next network service entity of the plurality of network service entities for monitoring by the second network services monitoring agent by transmitting, to the messaging service, instructions causing the messaging service to:
- dequeue, from the queue, a second message of the plurality of messages, wherein the second message comprises information identifying a second network service entity of the plurality of network service entities; and
- transmit, to the second network services monitoring agent, the second message;

receiving, by the second network services monitoring agent and from the messaging service, the second message;

identifying, by the second network services monitoring agent and based on the information identifying the second network service entity, the second network service entity as the next network service entity of the plurality of network service entities for monitoring by the second network services monitoring agent;

retrieving, by the second network services monitoring agent, from the second network service entity, performance and health metrics for the second network service entity; and transmitting, by the second network services monitoring agent, to the messaging service, and for transmission to the database, the performance and health metrics for the second network service entity.

8. A computing device of a co-location facility for distributing monitoring functions amongst a plurality of network services monitoring agents, the computing device comprising one or more processors configured to:
execute a queue, wherein a plurality of messages are enqueued within the queue, and wherein each message of the plurality of messages comprises information identifying a corresponding network service entity of a plurality of network service entities, wherein the plurality of network service entities comprises a plurality of physical devices and a plurality of virtual network functions (VNFs);
execute the plurality of network services monitoring agents, wherein, upon execution, a first network services monitoring agent of the plurality of network services monitoring agents is configured to:
request a next network service entity of the plurality of network service entities for monitoring by the first network services monitoring agent by transmitting instructions to a messaging service of the co-location facility, the instructions causing the messaging service to:
dequeue, from the queue, a first message of the plurality of messages, wherein the first message comprises information identifying a first network service entity of the plurality of network service entities; and
transmit, to the first network services monitoring agent, the first message;
receive, from the messaging service, the first message;
identify, based on the information identifying the first network service entity, the first network service entity as the next network service entity of the plurality of network service entities for monitoring by the first network services monitoring agent;
retrieve, from the first network service entity, performance and health metrics for the first network service entity; and
transmit, to the messaging service, and for transmission to a database of the co-location facility, the performance and health metrics for the first network service entity.

9. The computing device of claim 8,
wherein the first network services monitoring agent of the plurality of network services monitoring agents is further configured to transmit, to the messaging service, and for enqueueing in the queue, the first message, and
wherein the messaging service is further configured to enqueue, in the queue, the first message after transmitting, to the database, the performance and health metrics for the first network service entity.

10. The computing device of claim 9, wherein the first network services monitoring agent is configured to transmit, to the messaging service, a predetermined time, and wherein, to enqueue, in the queue, the first message, the messaging service is further configured to enqueue, in the queue, the first message after the predetermined time elapses.

11. The computing device of claim 9, wherein the first network services monitoring agent of the plurality of network services monitoring agents is further configured to:
receive instructions to suspend retrieval of performance and health metrics for the first network service entity; and
transmit, to the messaging service, instructions causing the messaging service to:
dequeue, from the queue, the first message describing the first network service entity; and
upon transmitting, to the database of co-location facility, the performance and health metrics for the first network service entity, discard, the first message without enqueuing the first message in the queue.

12. The computing device of claim 8, wherein the first network services monitoring agent of the plurality of network services monitoring agents is further configured to:
receive instructions to commence retrieval of performance and health metrics for a second network service entity of the plurality of network service entities;
determine that the queue does not contain a corresponding message comprising information identifying the second network service entity; and transmit, to the messaging service and for enqueueing in the queue, a second message comprising information identifying the second network service entity.

13. The computing device of claim 8, wherein the one or more processors are further configured to:
determine to adjust a number of the plurality of network services monitoring agents; and
in response to determining to adjust the number of the plurality of network services monitoring agents, perform one of an instantiation of one or more network services monitoring agents or a destruction of one or more network services monitoring agents.

14. The computing device of claim 8, wherein, upon execution of the plurality of network services monitoring agents, a second network services monitoring agent of the plurality of network services monitoring agents is configured to:
request a next network service entity of the plurality of network service entities for monitoring by the second network services monitoring agent by transmitting, to the messaging service, instructions causing the messaging service to:
dequeue, from the queue, a second message of the plurality of messages, wherein the second message comprises information identifying a second network service entity of the plurality of network service entities; and
transmit, to the second network services monitoring agent, the second message;
receive, from the messaging service, the second message;
identify, based on the information identifying the second network service entity, the second network service entity as the next network service entity of the plurality of network service entities for monitoring by the second network services monitoring agent;
retrieve, from the second network service entity, performance and health metrics for the second network service entity; and
transmit, to the messaging service, and for transmission to the database, the performance and health metrics for the second network service entity.

15. A non-transitory computer-readable medium comprising instructions that, when executed, cause one or more processors of a computing device of a co-location facility for distributing monitoring functions amongst a plurality of network services monitoring agents to:
execute a queue, wherein a plurality of messages are enqueued within the queue, and wherein each message of the plurality of messages comprises information identifying a corresponding network service entity of a plurality of network service entities, wherein the plurality of network service entities comprises a plurality of physical devices and a plurality of virtual network functions (VNFs);
execute the plurality of network services monitoring agents, wherein, upon execution of the plurality of network services monitoring agents, a first network services monitoring agent of the plurality of network services monitoring agents is configured to:
request a next network service entity of the plurality of network service entities for monitoring by the first network services monitoring agent by transmitting instructions to a messaging service of the co-location facility, the instructions causing the messaging service to:
dequeue, from the queue, a first message of the plurality of messages, wherein the first message comprises information identifying a first network service entity of the plurality of network service entities; and transmit, to the first network services monitoring agent, the first message;

receive, from the messaging service, the first message;

identify, based on the information identifying the first network service entity, the first network service entity as the next network service entity of the plurality of network service entities for monitoring by the first network services monitoring agent;

retrieve, from the first network service entity, performance and health metrics for the first network service entity; and transmit, to the messaging service, and for transmission to a database of the co-location facility, the performance and health metrics for the first network service entity.

16. The computer-readable medium of claim 15, wherein the first network services monitoring agent of the plurality of network services monitoring agents is further configured to transmit, to the messaging service, and for enqueueing in the queue, the first message, and wherein the messaging service is further configured to enqueue, in the queue, the first message after transmitting, to the database, the performance and health metrics for the first network service entity.

17. The computer-readable medium of claim 15, further comprising instructions that, when executed, cause the one or more processors to:

determine to adjust a number of the plurality of network services monitoring agents; and in response to determining to adjust the number of the plurality of network services monitoring agents, perform one of an instantiation of one or more network services monitoring agents or a destruction of one or more network services monitoring agents.

18. The computer-readable medium of claim 15, wherein, upon execution of the plurality of network services monitoring agents, a second network services monitoring agent of the plurality of network services monitoring agents is configured to:

request a next network service entity of the plurality of network service entities for monitoring by the second network services monitoring agent by transmitting, to the messaging service, instructions causing the messaging service to:

dequeue, from the queue, a second message of the plurality of messages, wherein the second message comprises information identifying a second network service entity of the plurality of network service entities; and transmit, to the second network services monitoring agent, the second message;

receive, from the messaging service, the second message;

identify, based on the information identifying the second network service entity, the second network service entity as the next network service entity of the plurality of network service entities for monitoring by the second network services monitoring agent;

retrieve, from the second network service entity, performance and health metrics for the second network service entity; and transmit, to the messaging service, and for transmission to the database, the performance and health metrics for the second network service entity.

19. The method of claim 1, wherein the queue is a First-in, First-out (FIFO) queue.

20. The method of claim 1, wherein the queue is a priority queue.

21. The method of claim 20, wherein each message of the plurality of messages is prioritized in the queue according to a time since a previous monitoring event of a network service entity of the plurality of network service entities corresponding to the message.

22. The method of claim 1, wherein the information identifying the corresponding network service entity of the plurality of network service entities comprises:

at least one of an Internet Protocol (IP) address of the network services entity or a Media Access Control (MAC) address of the network service entity;

routing or pathing information for connecting to the network service entity; and a communication protocol for communicating with the network service entity.

23. The method of claim 1, wherein each message of the plurality of messages further comprises:

a service type of the network service entity; and a type of performance and health metrics to be collected.

* * * * *